United States Patent [19]
Scheybeler

[11] Patent Number: 6,010,677
[45] Date of Patent: *Jan. 4, 2000

[54] METHOD AND APPARATUS FOR DEGASSING SULPHUR

[75] Inventor: Adolf Frederik Scheybeler, Peers, Canada

[73] Assignee: Knull Holdings Ltd., Leduc, Canada

[ * ] Notice: This patent is subject to a terminal disclaimer.

[21] Appl. No.: 08/659,454

[22] Filed: Jun. 6, 1996

Related U.S. Application Data

[63] Continuation of application No. 08/322,163, Oct. 13, 1994, abandoned.

[51] Int. Cl.$^7$ ........................................................ C01B 17/02
[52] U.S. Cl. ........................... 423/567.1; 423/573.1; 423/578.1
[58] Field of Search ............... 423/567.1, 573.1, 423/578.1; 366/173.1, 173.2; 137/888, 896

[56] References Cited

U.S. PATENT DOCUMENTS

| | | | |
|---|---|---|---|
| Re. 32,009 | 10/1985 | Ledford et al. | 423/578 R |
| 2,751,335 | 6/1956 | Carver et al. | 196/147 |
| 3,918,491 | 11/1975 | Weltmer | 137/604 |
| 4,243,648 | 1/1981 | Fenton | 423/573 R |
| 4,537,605 | 8/1985 | Gouw | 55/48 |
| 4,897,251 | 1/1990 | Maurice et al. | 423/578 R |

FOREIGN PATENT DOCUMENTS 51-35693   3/1976   Japan .

OTHER PUBLICATIONS

"Chemical Engineers' Handbook" By Perry, 3rd Edition, McGraw–Hill Book Co. (1950) New York, Toronto & London, pp. 1170–1175.
"Stop Emissions From Liquid Sulfur" By Lagas; Hydrocarbon Processing (Oct. 1982), pp. 85–89.

*Primary Examiner*—Steven P. Griffin
*Assistant Examiner*—Timothy C Vanoy
*Attorney, Agent, or Firm*—Stanley H. Zeyher

[57] ABSTRACT

A process for removing hydrogen sulfide out of liquid sulfur is provided by passing liquid sulfur and saturated steam through at least one acceleration nozzle within a container maintained at less than atmospheric pressure. The saturated steam and liquid sulfur discharged from the acceleration nozzles converge at a common point outside the acceleration nozzle and collide against an impact target so that hydrogen sulfide is removed out of the liquid sulfur. Two acceleration nozzles may be used positioned on a common plane with the outlets of the nozzles facing each other. The discharged steam adiabatically expands within the container which causes the discharged streams to accelerate and which also causes the temperature of the liquid sulfur drop.

8 Claims, 3 Drawing Sheets

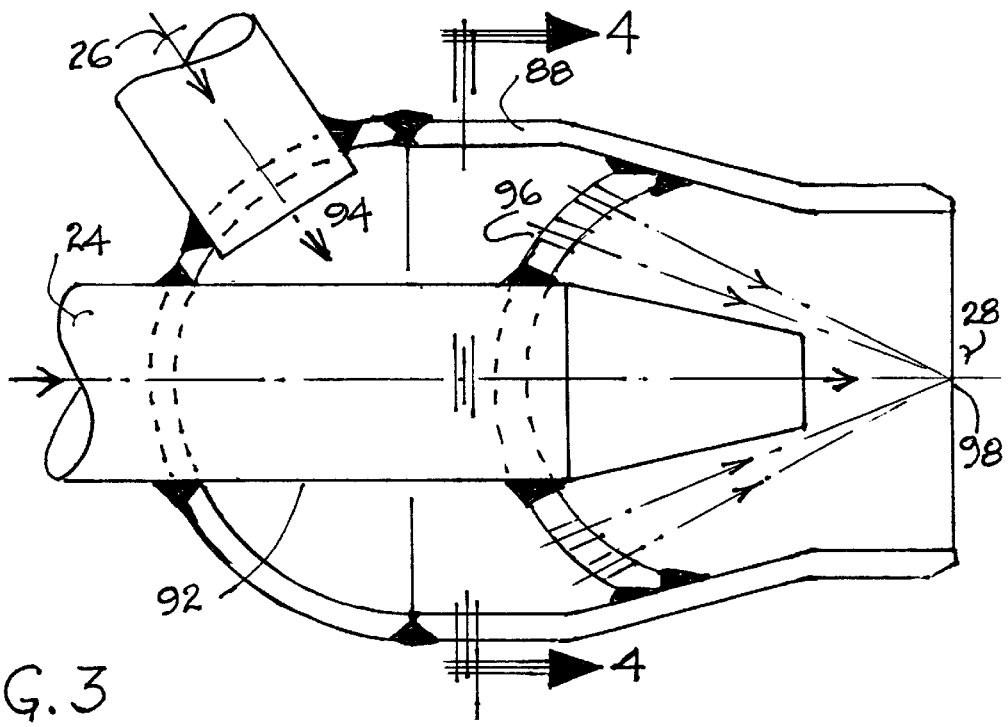
FIG. 3
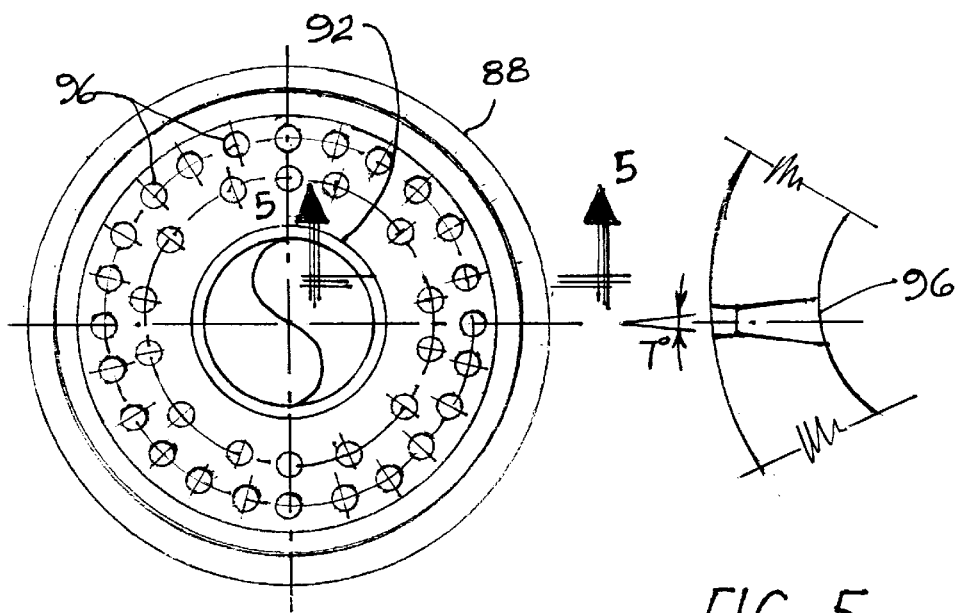
FIG. 4
FIG. 5

6,010,677

METHOD AND APPARATUS FOR DEGASSING SULPHUR

This application is a continuation of Ser. No. 08/322,163 filed Oct. 13, 1994 now abandoned.

FIELD OF THE INVENTION

The present invention relates to the removal of Hydrogen Sulfide gas from liquid sulphur.

BACKGROUND OF THE INVENTION

Hydrogen sulfide gas is nearly always present in sulphur produced during the processing of hydrocarbons. When the hydrogen sulfide gas exceeds 30 parts per million, it presents a danger to personnel of hydrocarbon processing plants. It is, therefore, desirable to degas the sulphur to remove hydrogen sulfide gas to below these levels.

The most common method for degassing sulphur involves steam sparging. In accordance with this method, steam is introduced into the liquid sulphur from below. The steam creates air bubbles which rise up through the liquid sulphur. As the air bubbles rise the volume of liquid sulphur above decreases and the surface pressure upon the air bubble decreases causing it to expand. The steam sparging method, as described, does not produce satisfactory results. The residence time in the liquid sulphur of the rapidly rising bubbles is too short and the surface area of the large bubbles is too limited to effectively release hydrogen sulfide gas from the liquid sulphur.

SUMMARY OF THE INVENTION

What is required is a method and apparatus for degassing sulphur that is more effective at releasing hydrogen sulfide gas.

According to one aspect of the present invention there is provided a method for degassing sulphur. Firstly, focus at least one nozzle at an impaction target. Secondly, direct streams of liquid sulphur through the at least one nozzle at the impaction target. Thirdly, inject saturated steam into the stream of liquid sulphur to create a mixed stream of steam and liquid sulphur. A rapid expansion of the steam causes an acceleration of each of the mixed stream of steam and liquid sulphur resulting in a violent collision with the impaction target.

With the method, as described, a stream of liquid sulphur is violently collided with an impaction target. Steam is used to dramatically increase the impact velocity. By following the teachings of this method impact velocities approaching 7000 feet per minute can be attained. It is preferred that a plurality of nozzles be positioned on a common horizontal plane with a stream from one of the nozzles serving as the impaction target for the other of the nozzles. A preferred configuration has two nozzles positioned in 180 degree opposed relation.

Although beneficial results can be obtained through the use of the method, as described, even more beneficial results may be obtained when a catalyst is injected with the saturated steam into the stream of liquid sulphur. The catalyst is a bonding agent capable of forming a chemical bond with hydrogen sulfide gas. The use of such a catalyst bonding agent enhances the process of degassing the sulphur. There are a variety of suitable catalyst bonding agents that can be used, such as amine or potassium citrate, to name just a few.

According to another aspect of the present invention there is provided an apparatus for degassing sulphur which is comprised of a containment vessel having a top, a bottom, and peripheral sidewalls. A plurality of inlet nozzles are secured on a common horizontal plane to the peripheral sidewalls. Each nozzle has a first inlet for receiving a first fluid, a second inlet for receiving a second fluid and a single outlet for discharging a mixed stream of the first fluid and the second fluid. The mixed discharge stream of one of the nozzles is focused at the mixed discharge stream of the other of the nozzles, such that the mixed discharge streams impact with each other. Means is provided for drawing vapours from the containment vessel positioned adjacent the top of the containment vessel. An outlet is positioned adjacent the bottom of the containment vessel for removing degassed sulphur.

Although there are a variety of configurations that can be used in terms of the number of nozzles, it is preferred that two nozzles are provided oriented in 180 degree opposed rotation.

Although there are a variety of nozzles that are capable of handling a mixed stream of steam and sulphur, it is preferred that the nozzle enhance the accelerating effect of the rapidly expanding steam. Even more beneficial results may be obtained when each nozzle includes a body having a passage leading to the outlet and the first inlet has an extension portion disposed in the passage. A steam chamber communicates with the first inlet and circumscribes the second inlet. The steam chamber has a plurality of injection ports focused to discharge at a single intersection point in the passage leading to the outlet. The "focused" injection ports, as described, tend to push the stream of liquid sulphur further enhancing the impact velocity.

BRIEF DESCRIPTION OF THE DRAWINGS

These and other features of the invention will become more apparent from the following description in which reference is made to the appended drawings, wherein:

FIG. 3 is a detailed side elevation view in section of a nozzle from the apparatus for degassing sulphur illustrated in FIG. 1.

FIG. 4 is a section view taken along section lines 4—4 of FIG. 3.

FIG. 5 is a section view taken along section lines 5—5 of FIG. 4.

DETAILED DESCRIPTION OF THE PREFERRED EMBODIMENT

Figure 1:
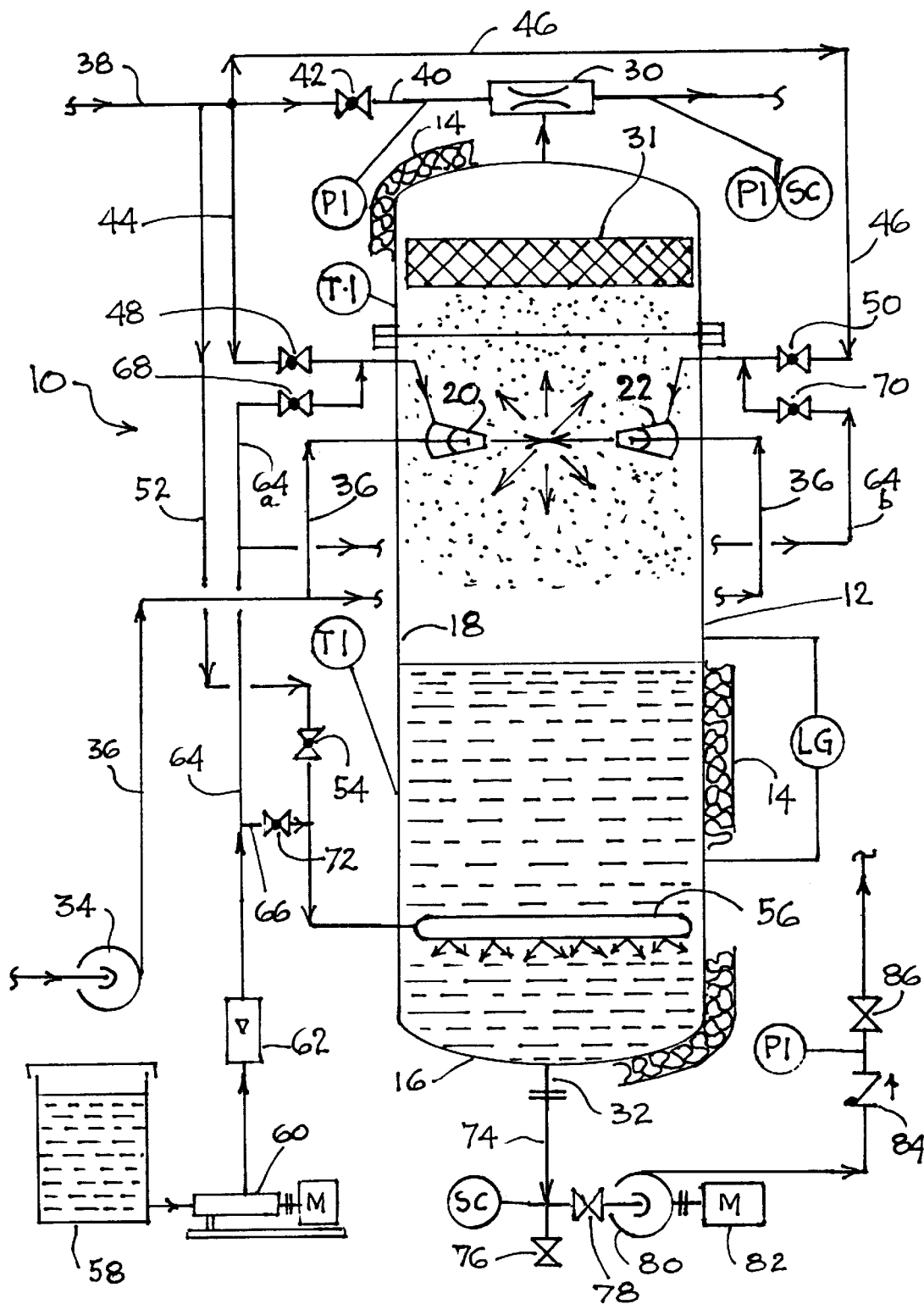
FIG. 1 is a front elevation view in section of an apparatus for degassing sulphur constructed in accordance with the teachings of the present method.

The preferred embodiment, an apparatus for degassing sulphur generally identified by reference numeral 10, will now be described with reference to FIGS. 1 through 5.

Figure 2:
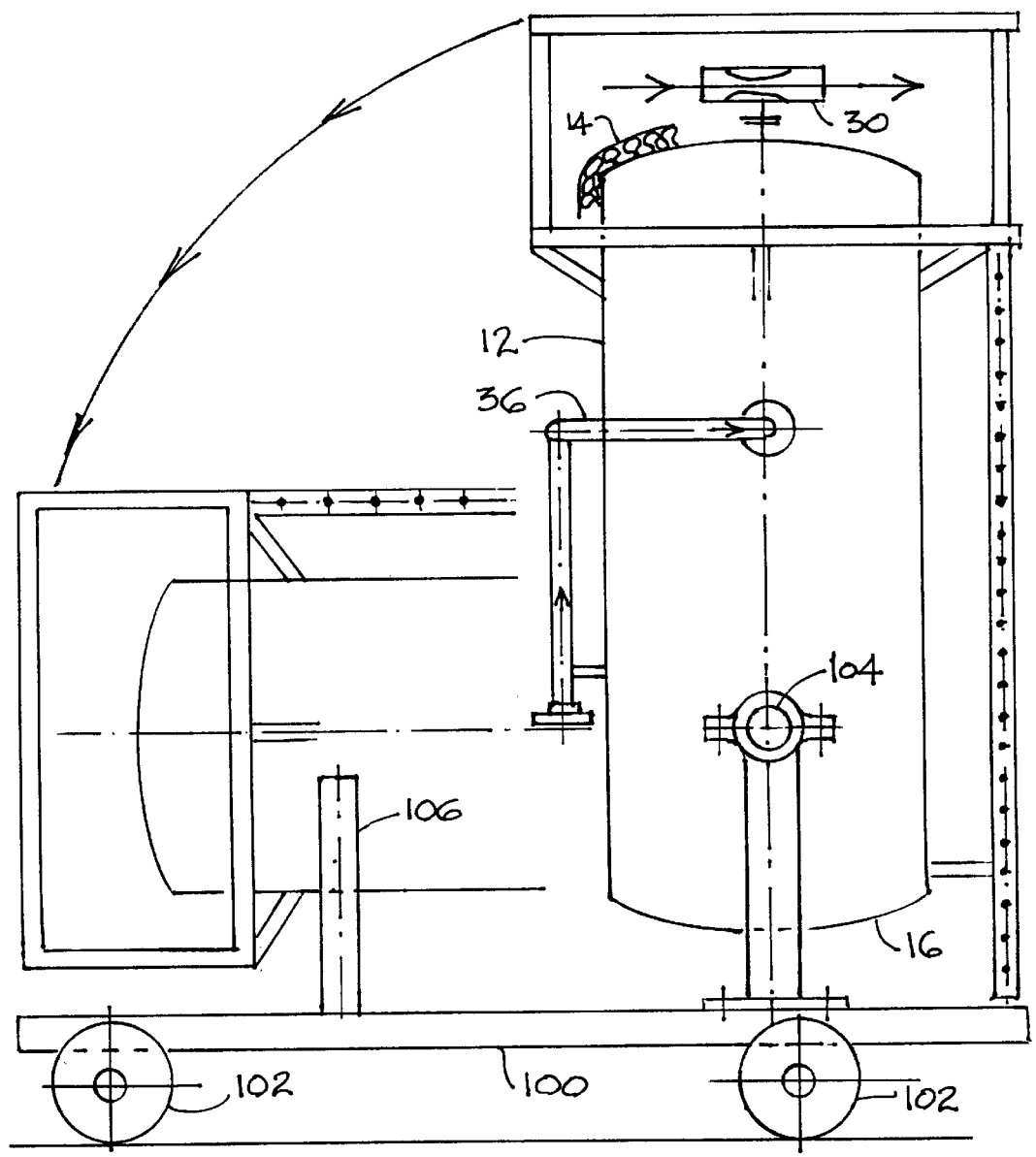
FIG. 2 is a side elevation view of the apparatus for degassing sulphur illustrated in FIG. 1.

Referring to FIG. 1, apparatus 10 includes a containment vessel 12 having a top 14, a bottom 16, and peripheral sidewalls 18. Two inlet nozzles 20 and 22 are secured on a common horizontal plane to peripheral sidewalls 18. Referring to FIG. 3, each nozzle 20 and 22 has a first inlet 24 for receiving a first fluid, a second inlet 26 for receiving a second fluid and a single outlet 28 for discharging a mixed stream of the first fluid and the second fluid. Referring to FIG. 1, nozzles are oriented in 180 degree opposed relation, such that the mixed discharge streams are directed to impact with each other. An eductor 30 is used as means for drawing vapours from containment vessel 12. Eductor 30 is positioned at top 14 of containment vessel 12. Vapours pass through a demister pad 31 to eductor 30. An outlet 32 is positioned adjacent bottom 16 of containment vessel 12 for removing degassed sulphur. A pump 34 is used to pump liquid sulphur through flow lines 36 to nozzles 20 and 22. Saturated steam passes through flow line 38, where it is diverted by a series of secondary flow lines. Secondary flow line 40 controlled by valve 42 brings saturated steam to eductor 30. Secondary flow lines 44 and 46 controlled by valves 48 and 50, respectively, bring saturated steam to nozzles 20 and 22. Secondary flow line 52 controlled by valve 54 brings saturated steam to steam sparger 56 positioned within containment vessel 12 spaced from bottom 16. Associated with the various saturated steam lines is a catalyst injection system. A catalyst from reservoir 58 passes through injection unit 50 and meter 62 into injection lines 64 and 66. Injection line 64 splits into two branches 64a and 64b leading to nozzles 20 and 22, respectively. Each of branches 64a and 64b is controlled by valves 68 and 70, respectively. Branches 64a and 64b tap into secondary steam flow lines 44 and 46, respectively, downstream of valves 48 and 50. Injection line 66 is controlled by valve 72. Injection line 66 taps into secondary steam flow line 52 leading to steam sparger 56, downstream of valve 54. Outlet 32 is connected to a drainage line 74, having two branches 74a and 74b. Connected to branch 74a of drainage line 74 is a drain valve 76; the use of which is limited to the cleaning of containment unit 12. Connected to branch 74b of drainage line 74 is a control valve 78 leading to a pump 80 driven by motor 82 and through a series of valves 84 and 86. Referring to FIG. 3, the preferred form of nozzle 20 and 22 includes a body 88 having a passage 90 leading to outlet 28. First inlet 24 has an extension portion 92 disposed in passage 80. A steam chamber 94 communicates with second inlet 26 and circumscribes extension portion 92 of first inlet 24. First inlet 24 communicates with sulphur flow lines 36. Second inlet 26 of nozzle 20 communicates with steam flow line 44 and second inlet 26 of nozzle 22 communicates with steam flow line 46. Steam chamber 94 has a plurality of injection ports 96 focused to discharge at a single intersection point 98 in passage 90 leading to outlet 28. Referring to FIG. 5, it can be seen that injection ports 96 are shaped to create a venturi effect. Referring to FIG. 3, the focusing of injection ports 96, as described, tend to push the stream of liquid sulphur further enhancing the impact velocity. The configuration of injection ports is further illustrated in FIG. 4. Referring to FIG. 2, it is preferred that containment unit 12 be made portable. For that purpose it is mounted on a platform 100 supported by ground engaging wheels 102. Containment unit 12 is mounted to platform 100 by means of a hinged mounting assembly 104. This enables containment unit 12 to be moved from a substantially vertical position, into a substantially horizontal position where top 14 of containment unit 12 is supported by a saddle support 106.

The use and operation of apparatus 10, as illustrated in FIGS. 1 through 5 will now be described in relation to the preferred method for which such apparatus was developed. Firstly, focusing at least one nozzle at an impaction target. In this case two nozzles 20 and 22 positioned in 180 degree relation on a common horizontal plane are used with a stream from one of the nozzles serving as the impaction target for the other of the nozzles, as previously described and illustrated with reference to FIG. 1. Additional nozzles can be added, if desired, Secondly, direct streams of liquid sulphur through nozzles 20 and 22. With reference to FIG. 1, liquid sulphur is pumped by pump 34 along flow lines 36 to first inlet 24 of both nozzles 20 and 22. Thirdly, inject saturated steam into the streams of liquid sulphur to create mixed streams of steam and liquid sulphur. With reference to FIG. 1, the saturated steam, as described, is provided to second inlet 26 of nozzles 20 and 22 through secondary steam flow lines 44 and 46, respectively. Referring to FIG. 3, it can be seen how saturated steam flowing through secondary inlet 26 is mixed with liquid sulphur pumped through first inlet 24. Liquid sulphur passes from first inlet 24 along extension portion 92 and into passage 90 leading to outlet 28. Saturated steam from secondary inlet 26, enters stem chamber 94 and then passes through injection ports 96 to intersect with the liquid sulphur at intersection point 98; prior to passing out of outlet 28 as a mixed stream. When a mixed stream of steam and liquid sulphur is created, as described, a rapid expansion of the steam causes an acceleration of each of the mixed streams of steam and liquid sulphur resulting in a violent collision of the mixed streams. In addition, it can be seen from a review of FIG. 3, having injection ports 96 focused upon intersection point 98 tend to push the stream of liquid sulphur further enhancing the impact velocity. With the method, as described, impact velocities approaching 7000 feet per minute can be attained. It is preferred that a catalyst be injected with the saturated steam into the stream of liquid sulphur. The catalyst is a bonding agent capable of forming a chemical bond with hydrogen sulfide gas. The use of such a catalyst bonding agent enhances the process of degassing the sulphur. There are a variety of suitable catalyst bonding agents that can be used, such as amine or potassium citrate. In FIG. 1, the containment unit 12 is set up for use with amine as the catalyst. Amine is placed in reservoir 58. It passes through injection unit 60 and meter 62 into injection lines 64 and 66. Injection line 64 splits into two branches 64a and 64b leading to nozzles 20 and 22, respectively. Each of branches 64a and 64b is controlled by valves 68 and 70, respectively. Branches 64a and 64b tap into secondary steam flow lines 44 and 46, respectively, downstream of valves 48 and 50. In this way amine is mixed with the saturated steam as it passes through secondary inlet 26 into steam chamber 94.

The degassing operation will now be summarized. High velocity sulphur steams are emitted from diametrically opposed nozzles 20 and 22. The streams are accelerated through steam injection. The mixed streams impact onto each other to produce an impact area that squeezes the dissolved Hydrogen sulfide gas out of the host sulphur molecule structure. The hydrogen sulfide gas is thus squeezed out of the liquid sulphur and removed from top 14 of containment unit 12 by a vacuum generated by eductor 30. The hydrogen sulfide gas will be evacuated, together with low pressure steam from inside containment unit 12. To achieve the above mentioned velocity, saturated steam at approximately 150 pounds per square inch is allowed to expand from steam chamber 94 through injection ports 96. The steam velocities so attained can reach speeds of 7000 feet per minute, depending upon the back pressure inside containment unit 12. The focus on intersection point 98 impacts further velocity to the mixed steam of steam and liquid sulphur. When the mixed stream collide, kinetic energy will be converted to potential energy (or pressure energy). The pressure change will be rapid, thus squeezing out the hydrogen sulfide gas in a solution state from inside the sulphur. A very large spray of small droplets is generated surrounding the impact area. The remaining hydrogen sulfide gas inside the droplets is presented with a second opportunity to escape through the surface area of the droplets. The pressure of containment unit 12 (steam, hydrogen sulfide gas and sulphur) will be kept low by eductor 30, thus assisting in the escape of the hydrogen sulfide gas out of the droplets. A catalyst, preferably amine, that is evaporated inside the steam will offer the hydrogen sulfide gas an easy replacement host, instead of the liquid sulphur. There is one last area where hydrogen sulfide gas can be removed from liquid sulphur. Steam sparger 56 receives amine through injection line 66. The result is that steam sparger 56, not only keeps the liquid sulphur hot, but also assists in additional hydrogen sulfide gas trace removal. The adiabatic expansion of the steam will cause the temperature of the sulphur to drop. This is the main function of steam sparger 56, to keep the liquid sulphur hot. The degassed liquid sulphur is withdrawn through outlet 32 at a fixed rate and under level control via pump 80 to a storage unit (not shown).

It will be apparent to one skilled in the art that modifications may be made to the illustrated embodiment without departing from the spirit and scope of the invention as hereinafter defined in the claims.

The embodiments of the invention in which an exclusive property or privilege is claimed are defined as follows:

1. A method for removing hydrogen sulfide out of liquid sulfur, comprising the steps:

providing at least one acceleration nozzle equipped with an inlet extension and an outer chamber that surrounds the inlet extension within a container maintained at less than atmospheric pressure;

passing hydrogen sulfide contaminated liquid sulfur through the inlet extension in at least one acceleration nozzle and passing saturated steam through an outer chamber that surrounds the inlet extension;

discharging the saturated steam and liquid sulfur from the acceleration nozzle so that the streams of saturated steam and liquid sulfur converge at a common point outside the acceleration nozzle and the streams of saturated steam and liquid sulfur collide against an impact target so that hydrogen sulfide is removed from the liquid sulfur;

removing the hydrogen sulfide out of the container via a vacuum, and removing the hydrogen sulfide-diminished liquid sulfur out of the container, wherein the discharged steam adiabatically expands within the container which causes the discharged streams to accelerate and which also causes the temperature of the liquid sulfur drop.

2. The method for removing hydrogen sulfide out of liquid sulfur set forth in claim 1, wherein the saturated steam and liquid sulfur are injected through a plurality of acceleration nozzles positioned on a common plane so that the stream from one acceleration nozzle serves as an impaction target for the streams from the other acceleration nozzles.

3. The method for removing hydrogen sulfide out of liquid sulfur set forth in claim 2, wherein two acceleration nozzles are used that are positioned so that the injection outlets of the acceleration nozzles face each other and the streams ejected therefrom collide forming a single, linear stream with a collision point between the two acceleration nozzles.

4. The method of removing hydrogen sulfide out of liquid sulfur set forth in claim 1, wherein the saturated steam contains a catalyst which is a bonding agent capable of forming bonds with the hydrogen sulfide.

5. The method of removing hydrogen sulfide out of liquid sulfur set forth in claim 4, wherein the catalyst is an amine.

6. The method of removing hydrogen sulfide out of liquid sulfur set forth in claim 4, wherein the catalyst is potassium citrate.

7. The method of removing hydrogen sulfide out of liquid sulfur set forth in claim 1, wherein the hydrogen sulfide-diminished liquid sulfur in the container is subjected to steam sparging to remove residual hydrogen sulfide out of the sulfur and restore heat to the sulfur lost due to the adiabatic expansion of the steam.

8. The method of removing hydrogen sulfide out of liquid sulfur set forth in claim 1, wherein the gases evacuated from the container are passed through demisters and plate separators to remove droplets of liquid sulfur out of the gases.

* * * * *

UNITED STATES PATENT AND TRADEMARK OFFICE
CERTIFICATE OF CORRECTION

PATENT NO. : 6,010,677
DATED : Jan. 04, 2000
INVENTOR(S) : Adolf F. Scheybeler

It is certified that error appears in the above-identified patent and that said Letters Patent is hereby corrected as shown below:

On the title page, under item [73], item [*] Notice: This patent is subject to a terminal disclaimer. It should be deleted from the title page.

Signed and Sealed this

Eighteenth Day of July, 2000

Attest:

Q. TODD DICKINSON

*Attesting Officer*  *Director of Patents and Trademarks*